United States Patent [19]

Horie

[11] Patent Number: 4,713,310

[45] Date of Patent: Dec. 15, 1987

[54] COLORED RESIN COMPOSITION

[75] Inventor: Shinji Horie, Yokkaichi, Japan

[73] Assignee: Mitsubishi Petrochemical Company Limited, Tokyo, Japan

[21] Appl. No.: 817,438

[22] Filed: Jan. 9, 1986

[30] Foreign Application Priority Data

Jan. 9, 1985 [JP] Japan .................................. 60-1770

[51] Int. Cl.⁴ .............................................. C08L 67/02
[52] U.S. Cl. ..................................... 430/109; 524/504;
524/513; 524/539; 525/63; 525/64; 525/68;
525/176; 525/177; 525/444; 525/445
[58] Field of Search .................. 524/504, 513; 525/63,
525/64, 176, 177, 445, 68; 430/109

[56] References Cited

U.S. PATENT DOCUMENTS

| | | | |
|---|---|---|---|
| 3,256,363 | 6/1966 | Horn | 524/513 |
| 3,974,078 | 8/1976 | Crystal | 430/109 |
| 4,016,132 | 4/1977 | Lees | 524/513 |
| 4,442,189 | 4/1984 | Lu | 430/45 |
| 4,592,990 | 6/1986 | Takagi | 430/137 |

FOREIGN PATENT DOCUMENTS

| | | | |
|---|---|---|---|
| 49-34744 | 9/1974 | Japan | 525/177 |
| 1183086 | 3/1970 | United Kingdom | 525/408 |

*Primary Examiner*—Patricia A. Short
*Attorney, Agent, or Firm*—Robert E. Burns; Emmanuel J. Lobato

[57] ABSTRACT

A colored resin composition characterized in that it has a matrix of a thermoplastic polymer (A), typically a polyester, and a thermoplastic polymer (B), typically a styrene polymer, which is dispersed in the matrix and is separated in phase from the matrix, and the polymer (B) is filled with substantially the entire quantity of a colorant. Since the colorant is blended in only the dispersed phase polymer (B), deterioration due to the colorant of various characteristics, such as bleed-out of the colorant, is prevented in the colored resin composition according to this invention.

9 Claims, No Drawings

COLORED RESIN COMPOSITION

BACKGROUND OF THE INVENTION

1. Technical Field

This invention relates to a resin composition in which a colorant is contained in a specific form, whereby deterioration of its various characteristics ordinarily caused by its being filled with a colorant is prevented, and, moreover, the resin composition is uniformly colored.

More specifically, the present invention relates to a colored resin composition which is suitable for use in the field of colored materials and in which a colorant can be dispersed uniformly and minutely even when the colorant is blended thereinto. Moreover, deterioration of its various characteristics caused by the colorant, such as bleedout, is prevented.

2. Prior Art

Thermoplastic polymers are employed widely in various fields because of their mechanical characteristics, excellent moldability, etc. Because of the broadness of their applicability, there are many fields in which coloration is required, and many more applications can be expected as a result of coloration.

The coloration operation is desirably performed by an operation which is as simple as possible, such as by simple mixing. When a colorant is blended into a thermoplastic resin, a speckled pattern due to ununiform dispersion, or in worse cases bleed-out, may be caused. Further, due to presence of the colorant, the properties inherently possessed by the thermoplastic polymer such as electrostatic characteristic, coating characteristic, and chemical resistance as surface characteristics may be markedly impaired, whereby a colored product which can be provided for practical application cannot be obtained.

SUMMARY OF THE INVENTION

An object of the present invention is to overcome all at once such problems existing in carrying out coloration of thermoplastic polymers, namely, ununiform dispersion such as speckled patterns and deterioration of surface characteristics.

To cope with such problems, according to the present invention, the function of the colorant and the function of the thermoplastic polymer are separated between the matrix or continuous phase and the dispersed phase of the composition, respectively, so that both functions are clearly distinguished from each other. More specifically, the present invention is based on the finding that the above object can be attained by confining the colorant within the dispersed phase thereby to prevent the thermoplastic polymer in the matrix from being influenced by the colorant, and further by improving uniformness of coloration by dispersing the dispersed phase minutely and uniformly in the matrix.

Thus, the colored resin composition according to the present invention is characterized in that it has a matrix of a thermoplastic polymer and dispersed phases of a thermoplastic polymer which are dispersed in said matrix and separated from the matrix phase, and the polymer constituting the dispersed phase is filled with or contains substantially the entire amount of the colorant.

DETAILED DESCRIPTION OF THE INVENTION

Composition

General Description

The composition of the present invention comprises a matrix phase of a thermoplastic polymer (A) and dispersed phases of a thermoplastic polymer (B) containing a colorant (C).

The thermoplastic polymers (A) and (B) must be different from each other to an extent sufficient for causing phase separation in the present composition, but they are not necessarily required to be thermoplastic polymers of chemically different species. In other words, the composition of the present invention can be formed even from polymers of the same monomers, provided that they are not miscible uniformly with each other by changing their properties such as polymerization degree, molecular weight and compatibility changed by the preparation conditions or by treating one of the polymers.

Futhermore, since it is required in the present invention that substantially the entire amount of the colorant (C) fills or remains in the dispersed phases of the polymer (B), the polymers (A) and (B) should be different in affinity for the colorant (C). More specifically, the affinity between B and C should be greater than the affinity between A and C. In this case, the "affinity" may be, for example, "electrical attracting force".

Primarily on the basis that the thermoplastic polymer (A) is greater in amount than the thermoplastic polymer (B) in the present composition, the polymer (A) constitutes the matrix phase and polymer (B) constitutes the dispersed phase.

For producing such a construction as described above, the thermoplastic polymers (A) and (B) in the composition of the present invention are chosen from the group of common thermoplastic polymers with due consideration of the points stated above.

Accordingly, the polymerization methods set forth below as preferable for preparation of the thermoplastic polymer (A) and for preparation of the thermoplastic polymer (B), respectively, can be utilized in use one for the other with necessary modifications.

Matrix

Examples of the kinds of thermoplastic polymers for constituting the matrix in the present invention are: (1) so called olefin polymers, including homopolymers or copolymers of α-olefins having about 2 to 8 carbon atoms (inclusive of ethylene) such as ethylene, propylene, butene-1, pentene-1, 4-methylpentene-1, and hexene-1,or otherwise block, random or graft copolymers containing more that half in weight of these α-olefins with other unsaturated compounds copolymerizable therewith, or modified polymers prepared by applying treatment such as halogenation, sulfonation, oxidation, etc. to these homopolymers or copolymers; or (2) resins or rubbers, including acrylonitrile-styrene copolymer (AS resin), styrene-butadienen-styrene block copolymer, polystyrene polymers, particularly homopolymers or copolymers of styrene or nucleus- and/or side chain-substituted styrene (the substituent is preferably a lower alkyl or a halogen, particularly chlorine) such as copolymers with acrylonitrile, acrylic acid, methacrylic acid or lower alkyl esters thereof (e.g., polystyrene); polycarbonate; polyester; polyamide; polyacrylonitrile; and lower alkyl (particularly methyl) methacrylate.

In the above olefin polymer, other unsaturated compounds copolymerizable with α-olefin include vinyl esters of saturated aliphatic carboxylic acids having about 2 to 4 carbon atoms, vinyl silanes such as vinyl trimethoxysilane and vinyl triacetoxysilane, and ethylenically unsaturated monomers other than the α-olefins of the polymers as exemplified above.

Among the thermoplastic polymers which can be used in the present invention, those producing the marked effect of the present invention are transparent in nature. Above all, a polyester is one of preferable polymers for use as the matrix phase.

A polyester used in the present invention is chosen suitably from those obtained by polycondensation of polybasic acids and polyhydric alcohols conventionally used, and polyesters which are solid at ordinary temperatures at which the colored polyester composition of the present invention is chosen can be used.

The polybasic acid is preferably a dibasic, tribasic or tetrabasic acid, more preferably a dibasic or tribasic acid, particularly a dibasic acid. These polybasic acids include, for example, (a) aromatic carboxylic acids, particularly those having 2 to 3 carboxylic groups bonded to unsubstituted or lower-alkyl-substituted benzene rings such as terephthalic acid, isophthalic acid, and trimellitic acid; (b) saturated aliphatic carboxylic acids, particularly those ω-dicarboxylic acids having about 3 to 8 carbon atoms or $C_1$–$C_{14}$ hydrocarbyl-substituted compounds thereof such as adipic acid, succinic acid, n-dodecenylsuccinic acid, iso-dodecenylsuccinic acid, n-dodecylsuccinic acid, n-octylsuccinic acid, iso-octylsuccinic acid, n-butylsuccinic acid, and hexahydroterephthalic acid; (c) aliphatic unsaturated carboxylic acids, particularly unsaturated compounds corresponding to the aliphatic carboxylic acids of the above (b) such as maleic acid and fumaric acid. In the synthesis of polyesters, it is an ordinary practice to employ these polybasic acids in the form of their lower alkyl esters or anhydrides.

On the other hand, the polyhydric alcohol is preferably a di- to hexa-hydric alcohol, more preferably di- or tri-hydric alcohol, particularly a dihydric alcohol. Those having numbers of carbon atoms of the order of 2 to 18 are preferred. Examples of these polyhydric alcohols are; (a) ethylene glycol, propylene glycol, 1,4-butane diol, hexamethylene glycol, neopentyl glycol, 2,2,4,4-tetramethyl tetramethylene glycol, glycerine, trimethylolpropane, bisphenol A, hydrogenated bisphenol A, and sorbitol; or (b) alkylene oxide adducts thereof (particularly ethylene oxide, propylene oxide) such as polyoxyethylene (10) sorbitol, polyoxypropylene (5) glycerine, polyoxyethylene (4) pentaerythritol, polyoxypropylene (2,2)-2,2-bis(4-hydroxyphenyl)propane, and polyoxyethylene (2)-(2,2-bis(4-hydroxyphenyl)propane.

A polyester which can exhibit markedly the effect of the present invention has a glass transition temperature of 40° to 150° C., particularly 60° to 130° C., and a number-average molecular weight of 500 to 30,000, particularly 1,000 to 20,000. From a practical viewpoint, when the composition of the present invention is applied for the fields such as paints, developers, and binder, it is preferable to use a polymer which is amorphous with a crystallinity of less than 5% as measured by X-ray analysis, particularly one which is soluble in a solvent.

Dispersed phase/polymer

On the other hand, a preferable thermoplastic polymer for constituting the dispersed phase is a styrene polymer. More specifically, suitable styrene polymers are, for example, styrene polymers as mentioned above for use in the matrix, particularly polystyrene, or copolymers of styrene with not more than half in weight of copolymerizable monomers, for example, lower alkyl esters of acrylic acid such as methyl acrylate, lower alkyl esters of methacrylate acid such as methyl methacrylate, n-butyl methacrylate and (or) acrylic acid or methacrylic acid. Among these styrene polymers, those having a glass transition temperature of 30° to 105° C., particularly 40° to 80° C., and a number average molecular weight of 1,000 to 150,000, particularly 2,000 to 100,000 can exhibit great effectiveness.

Preferable styrene polymers used in the present invention are copolymers comprising 95 to 55% by weight of styrene and 5 to 45% by weight to lower alkyl esters of unsaturated mono- or di-carboxylic acid such as n-butyl acrylate, n-butyl methacrylate, and di-n-butyl fumarate.

The dispersed phase comprises such a polymer filled with a colorant (as described in detail below).

Dispersed phase/colorant

A colorant which can be used in the present invention must meet at least the following two requirements.

(i) The colorant must have the property of being capable of penetrating into the thermoplastic polymer constituting the dispersed phase. Accordingly, generally speaking, a colorant having greater affinity for the thermoplastic polymer constituting the dispersed phase than the affinity for the thermoplastic polymers constituting the matrix is preferred. When the colorant itself has no such property, the above property may be imparted to the colorant by a measure such as treatment with other components.

In other words, it is required that the colorant, itself, or by treatment with other components, for example, have greater affinity for the polymer of at least one component of the thermoplastic polymers constituting the dispersed phase than affinity for the thermoplastic polymer constituting the matrix.

(ii) The size of the colorant (mean dispersed size) should be smaller than the dispersed phase.

Any colorant can be used in the present invention without adverse effect, provided that it does not cause discoloration or abnormality in resin characteristics during coloration. Specific examples are basic dyes such as Rhodamine B, acidic dyes, fluorescent dyes, azo type dyes, anthranquinone type dyes, azine type dyes, and metal complex compound type dyes, and in addition red iron oxide, titanium oxide, cadmium yellow, cadminum red, basic dye lake, and phthalocyanine type pigments. Among these, dyes or organic pigments, particularly the dyes are preferred since they do not impair the transparency of the composition.

One of the characteristics of the present invention is that the component constituting the dispersed phase is filled with the colorant. Namely, in addition to the greater affinity of the colorant for the dispersed phase than for the matrix phase, the interactions between the matrix phase, the dispersed phase and the colorant are important. For example, in the composition of the present invention, the colorant is required to remain in the dispersed phase not only in the solid state at normal temperature, as a matter of course, but also in the liquid state even after once becoming molten by being subjected to thermal history. In other words, it is important that the colorant be prevented from being diffused into the matrix phase.

In order to cause the colorant to remain within the dispersed phase without being diffused into the matrix phase, it is desirable to choose combinations thereof so that the electrical attracting force between the dispersed phase resin (B) and the colorant (C) is greater than the electrical attracting force between the matrix phase resin (A) and the colorant (C). Above all, the effect of the present invention is remarkable in the case when the matrix phase resin (A) and the dispersed phase resin (B) are both negative or the former (A) is neutral and the latter (B) is negative, when the colorant (C) is electrically (particularly electrostatically or ionically) positive; or in the case when the matrix resin (A) and the dispersed resin (B) are both positive or the former (A) is neutral and the latter (B) is positive, when the colorant (C) is electrically negative. In general, a positive colorant is preferable for its transparency.

For making the matrix phase resin (A) and the dispersed phase resin (B) different in electrical properties, it is preferable to introduce functional groups for exhibiting desired electrical properties into one of the resins or to introduce functional groups for exhibiting electrical properties which are opposed to each other into both of the resins. (If resins having such functional groups already exist, they can be of course chosen and used).

Thermoplastic polymers having such functional groups include, for example, thermoplastic polymers comprising copolymers (inclusive of graft copolymers) containing as a comonomer unsaturated organic acids, alkyl esters or anhydrides thereof (specifically acrylic acid, methacrylic acid, itaconic acid or anhydride thereof) as those having negative electrical properties, or containing as comonomer vinyl monomers having amino or amide group or quaternarized salt thereof (specifically N,N-dimethylaminoethyl methacrylate, N,N-diethylaminoethyl methacrylate, N-ethyl-N-phenylaminoethyl methacrylate, N,N-dimethylaminopropyl methacrylamide, N,N-diethylaminopropyl methacrylamide, N,N-dimethylaminoethyl methacrylamide, N,N-diethylaminoethyl methacrylamide, vinyl pyridine, and vinyl piperizine) as those having positive electrical properties (such polymers are sometimes called responsive polymers herein).

Preparation/formation of phase structures

In the composition of the present invention, the dispersed phase is preferably dispersed minutely and uniformly in the matrix phase. Such a uniform dispersion system can be formed in the case of a mechanical blend of a matrix polymer and a polymer constituting the dispersed phase (colorant containing polymer) by choosing suitably the kinds of their compositions (molecular weight, molecular weight distribution, copolymerization ratio, random characteristic, etc. being also considered), the blending conditions (device, temperature, kneading speed, time, etc.), and other factors.

In the case of such a mechanical blend, one preferred mode for preparing a uniform dispersion system is a method in which a dispersing aid is used.

The dispersing aid used in the present invention can be obtained by subjecting a thermoplastic resin compatible with the matrix phase (preferably the same as the matrix phase) and a vinyl polymer, which is compatible with (preferably the same as) the dispersed phase when converted to a polymer, to graft reaction conditions.

As a method for preparing the above dispersing aid by subjecting a thermoplastic polymer, and a vinyl monomer to graft reaction conditions, any of the following six methods may be employed: (1) a method in which the thermoplastic polymer is dissolved in a solvent and the reaction is carried out by charging the vinyl monomer into the resultant solution; (2) a method in which the reaction is carried out by dissolving the vinyl monomer in the thermoplastic polymer; (3) a method in which the thermoplastic polymer particles are suspended in water, the vinyl monomer is added to the suspension to impregnate the polymer particles, followed by carrying out the reaction; (4) a method in which the reaction is carried out under the state where a solution of the thermoplastic polymer dissolved in the vinyl monomer is floated as liquid droplets in water; (5) a method in which the vinyl monomer is allowed to react with the thermoplastic polymer under molten state; and (6) the radiation grafting method. Among these, the above method (3) or (4) is preferred.

In carrying out the reaction, a polymerization initiator is generally employed. As the polymerization initiator, those employed for radical polymerization in general can be used, but it is preferable to choose one from those having a decomposition temperature of 45° to 110° C., particularly 50° to 105° C., in view of the temperature of the polymerization reaction. The decomposition temperature as herein mentioned means the temperature attained when the decomposition rate of the radical initiator becomes 50% after 0.1 mole of the polymerization initiator added into one liter of benzene is left to stand at a certain temperature for 10 hours.

Specific examples of such initiators are organic peroxides such as 2,4-dichlorobenzoyl peroxide (54° C.). t-butylperoxypivalate (56° C.), o-methylbenzoyl peroxide (57° C.), bis-3,5,5-trimethylhexanoyl peroxide (60° C.), octanoyl peroxide (61° C.), lauroyl peroxide (62°), benzoyl peroxide (74° C.), t-butylperoxy-2-ethylhexanoate (74° C.), 1,1-bis(t-butyloxy)-3,3,5-trimethylcyclohexane (91° C.), cyclohexanone peroxide (97° C.), 2,5-dimethyl-2,5-dibenzoylperoxyhexane (100° C.), t-butylperoxybenzoate (104° C.), di-t-butyl-diperoxyphthalate (105° C.), methyl ethyl ketone peroxide (109° C.), dicumul peroxide (117° C.), di-t-butyl peroxide and the like; azo compounds such as azobisisobutyronitrile (65°C.), azobis(2,4-dimethylvaleronitrile) (68° C.), 2-t-butylazo-2-cyanopropane (79° C.) and the like; and water-soluble peroxides such as hydrogen peroxide and potassium persulfate (about 70° C.). Here, the temperatures in the brackets indicate decompostion temperatures. These initiators can be used also in combination. The amount of the polymerization initiator used is within the range of from 0.05 to 30% by weight, preferably from 0.1 to 10% by weight.

The dispersing aid used in the present invention can produce a dispersed phase which is amply minute and uniform if added in an amount of about 1% by weight. Although it is preferably used in an amount of 3% by weight or more, the dispersing agent itself is also a suitable thermoplastic polymer as a forming material, and therefore the case in which such a polymer exists as the dispersed phase formulated directly with the colorant should be understood to be within the scope of the present invention.

For a combination of a polyester used as the matrix and a styrene polymer used as the dispersed phase, a preferable dispersing agent is a polyester modified with a styrene type monomer, that is a polyester subjected to graft reaction with a styrene type monomer.

Generally speaking, the particle size of the dispersed phase in the matrix phase should preferably be 10μ (micron) or less, particularly preferably 5μ or less. The particle size as herein mentioned refers to the average primary particle size (Martin's size) as measured by observation of the cross-section of a sample by electron microscope.

Another method for preparing the composition of the present invention comprises forming in situ a dispersing aid comprising a copolymer subjected to grafting treatment. For example, a monomer (e.g., styrene) for producing a resin for the dispersed phase is graft copolymerized with a resin for the matrix (e.g., polyester). After graft copolymerization, the ordinary practice is to knead the mixture for uniform dispersion of the dispersed phase.

EXPERIMENTAL EXAMPLES

Reference Example 1

[Preparation of a modified polyester (dispersing aid)]

Into an autoclave of 10-liter inner volume were charged 4 kg of water, 80 g of tribasic calcium phosphate and 0.12 g sodium dodecylbenzenesulfonate to obtain an aqueous medium, and a solution of 8 g of benzoyl peroxide ("Nyper B" produced by Nippon Yushi Co.) dissolved in a mixture of 640 g of styrene and 160 g of n-butyl methacrylate was added thereto, the mixture then being stirred. Into the resultant mixture were charged 1,200 g of polyester particles ("Vylon GV100" produced by Toyo Boseki Co.: amorphous saturated polyester; glass transition temperature: 51.1° C.; number-average molecular weight: about 3,000), and, after replacement of the atmosphere in the autoclave with nitrogen, the temperature in the system was elevated to 60° C., which temperature was then maintained for 3 hours to cause the vinyl monomer containing the polymerization initiator to become impregnated into the polyester resin particles. Subsequently, 11.4 g of t-butylperoxypivalate ("Perbutyl PV" produced by Nippon Yushi Co.) was charged into the suspension system, and further the temperature within the system was elevated to 65° C. and maintained thereat for 2 hours to initiate polymerization of the surfaces of the polyester particles. Then, the temperature within the system was elevated to 90° C. and maintained thereat for 3 hours to complete polymerization. After cooling, the contents were taken out, washed with acid and washed with water to obtain 2 kg of modified resin particles.

Reference Example 2

(Preparation of a styrene polymer)

Into an autoclave of 10-liter inner volume were charged 4 kg of water, 80 g of tribasic calcium phosphate and 0.12 g of sodium dodecylbenzenesulfonate to obtain an aqueous medium, and a solution of 28.6 g of "Perbutyl PV" and 20 g of "Nyper B" dissolved in a mixture of 1.4 kg of styrene, 560 g of n-butyl methacrylate and 40 g of acrylic acid was added thereto, the mixture then being stirred. After the atmosphere within the autoclave was replaced with nitrogen, the temperature within the system was elevated to 65° C., which temperature was then maintained for 3 hours. Further, the temperature within the system was elevated to 75° C. and maintained thereat for 3 hours, and thereafter the temperature within the system was elevated to 90° C. and maintained thereat for 2 hours to complete polymerization. After cooling, the contents were taken out, washed with acid, washed with water and dried to obtain 2 kg of a copolymer resin.

When quantitative determination by IR spectrum was carried out on this product, it was found to contain 70 wt. % of styrene, 28 wt. % of n-butyl methacrylate and 2 wt. % of acrylic acid, indicating that the reaction proceeded substantially quantitatively. The product was also found to have a glass transition temperature of 76.6° C. and a number-average molecular weight of about 25,000.

Reference Example 3

(Preparation of a styrene polymer)

According to the method in Reference Example 2, except for using 15 kg of styrene and 0.5 kg of n-butyl methacrylate, binary copolymerization was carried out to obtain 2 kg of a styrene polymer. This product was found to have a glass transition temperature of 71.5° C. and a number-average molecular weight of about 28,000.

Reference Example 4

(Preparation of a styrene polymer)

In Reference Example 2, acrylic acid was replaced with maleic anhydride and otherwise the same procedure was conducted to obtain 2 kg of a copolymer resin which was a styrene polymer. This product was found to have a glass transition temperature of 73.5° C. and a number-average molecular weight of about 25,000.

EXAMPLE 1

A blend of 30 parts by weight of the styrene polymer obtained in Reference Example 2 and 5 parts by weight of "Rhodamine B base" were melted and kneaded through a twin-screw extruder equipped with a vent at 140°.

The resultant mixture (35 parts by weight), 65 parts by weight of the polyester used in Reference Example 1 and 10 parts by weight of a modified polyester obtained in Reference Example 1 as the dispersing aid were melted together and kneaded at 140° C. through a twin-screw extruder equipped with a vent.

From the thus obtained colored composition, a press sheet was prepared, and further a cross-section was made and subjected to ion etching treatment for observation of the dispersed phase by a scanning type electron microscope. As a result, the dispersed phase was found to be dispersed uniformly and minutely with a mean particle size of 3.0μ. Also, the colored composition was sandwiched between a slide glass and a cover glass on a hot press and thermally fused to be made into a thin film. The filling state of the colorant was observed by a transmission type optical microscope to find that the colorant had filled or was contained in the dispersed phase.

EXAMPLE 2

A colored composition (II) was obtained in the same manner as in Example 1 except for replacing the styrene polymer used in Example 1 with 15 parts by weight of the styrene polymer prepared in Reference Example 2 and 15 parts by weight of the styrene polymer prepared in Example 3.

For this product, the same evaluations as in Example 1 were carried out, and it was observed that the colorant had filled the dispersed phase and the dispersed phase was uniformly and minutely dispersed with a mean particle size of 2.3μ.

EXAMPLE 3

A colored composition (III) was obtained as in Example 2 except for changing the colorant to copper phthalocyanine (Phthalocyanine Blue).

For this product, the same evaluations as in Example 1 were made, and it was observed that the colorant had filled the dispersed phase and the dispersed phase was uniformly and minutely dispersed with a mean particle size of 3.3μ.

EXAMPLE 4

A colored composition (IV) was obtained as in Example 1 except for changing the styrene polymer to that prepared in Reference Example 4.

For this product, the same evaluations as in Example 1 were made, and it was observed that the colorant had filled the dispersed phase, and the dispersed phase was uniformly and minutely dispersed with a mean particle size of 3.0μ.

EXAMPLE 5

A colored composition (V) was obtained as in Example 1 except for using no dispersing aid.

For this product, the same evaluations as in Example 1 were made. The dispersed phase was dispersed relatively uniformly with a mean particle size of 6.0μ, and the colorant was found to have filled the dispersed phase.

COMPARATIVE EXAMPLE 1

A colored composition (VI) was obtained as in Example 1 except for using the styrene polymer obtained in Reference Example 3 in place of the sytrene polymer used in Example 1.

When the same evaluations were made for this product, it was observed that the dispersed phase was dispersed minutely with a mean particle size of 3.0μ, but the colorant had filled not only the dispersed phase but also the matrix phase.

EXAMPLE 6

Into an autoclave of 10-liter inner volume, 420 g of an amorphous saturated polyester ("Vylon 200" produced by Toyo Boseki Co.: glass transition temperature: 63° C., number-average molecular weight: about 20,000), 600 g of styrene, 180 g of n-butyl methacrylate and 50 g of the colorant used in Example 1 were charged and dissolved under stirring at 60° C. The solution had a viscosity of 190 centipoise. To the solution was added 55.7 g of "Perbutyl PV" as a radical generating agent to be dissolved therein, and 7.2 g of sodium dodecylbenzenensulfonate and 2.4 kg of water were further added, which step was followed by stirring to cause phase inversion from oil phase into aqueous suspended phase. Then, the atmosphere within the autoclave was replaced with nitrogen, and the temperature within the system was elevated to 65° C., maintained thereat for 4 hours, and further elevated to 75° C., being maintained thereat for 2 hours to complete polymerization. After cooling, the contents were taken out and washed with water to obtain 1,250 g of a modified colored resin.

From this product, a press sheet was prepared and the same evaluations as in Example 1 were made. As the result, the colorant was found to have filled the dispersed phase of the modified polyester, and the dispersed phase to have dispersed uniformly and minutely with a mean particle size of 2.6μ.

EXAMPLE 7

(Preparation of a colored polyester composition (I))

A blend of 25 parts by weight of an amorphous saturated polyester (A) ("Vylon GV230" produced by Toyo Boseki Co.: glass transition temperature 62° C., acid value: 55 KOH mg/g; hydroxyl value: 1.0 KOH mg/g; number-average molecular weight: about 4,000) and 5 parts by weight of Rhodamine B base was melted and kneaded through a twin-screw extruder equipped with a vent at 140° C. A blend of 25 parts by weight of the resultant mixture and 70 parts by weight of an amorphous saturated polyester (B) ("Vylon GV100" produced by Toyo Boseki Co.: glass transition temperature: 51.1° C.; hydroxyl value: 40 KOH mg/g; acid value: 2.0 KOH mg/g; molecular weight: about 3,000) was melted and kneaded through a twin-screw extruder equipped with a vent at 140° C. to obtain a colored polyester composition (I).

(Observation of micro-phase separation)

From the colored polyester composition (I), a press sheet was prepared. A cross-section of the press sheet was made and subjected to ion etching treatment, and then the cross-section was observed by a scanning type electron microscope. As a result, it was found that the mean particle size in the dispersed phase was 0.5μ, and the particles were uniformly and minutely dispersd in the matrix.

Also, the colored polyester composition (I) was sandwiched between a slide glass and a cover glass and thermally fused on a hot press to be made into a thin film. When the thin film was observed by a transmission type optical microscope, the colorant was found to have filled the dispersed phase.

(Preparation of uncolored polyester composition and observation thereof)

By the use of the polyester (A) and the polyester (B), the same melting and mixing was carried out as in Example 7 except for adding no colorant, and the polyester composition was observed according to the same evaluation method. As a result, the so called microphase separation could not clearly be observed.

(Application in color toner for electrophotography)

The colored composition (I) obtained was micropulverized by a jet mill to obtain a color toner for electrophotography with a mean particle size of 12μ. The amount of triboelectric charging was measured by the blow-off method to be −23 μC/g, indicating good charging characteristic. Further, after the toner had been maintained in a gear oven at 45° C. for one month to promote bleed-out, the amount of triboelectric charging was measured to be −24 μC/g, thus indicating stable charging characteristic with little change.

COMPARATIVE EXAMPLE 2

A blend of 95 parts by weight of the same polyester (A) as used in Example 7 and 5 parts by weight of Rhodamine B base was melted and kneaded through a twin-screw extruder equipped with a vent at 140° C. to obtain a composition having a colorant dispersed in one kind of polyester. This composition was micropulverized in the same manner as in Example 7 to obtain a color toner for electrophotography with a mean particle size of 13μ. The triboelectric charging quantity of this product was measured to be −22 μC/g, indicating good charging characteristic. However, after the bleed-out promotion test conducted similarly as in Example 7, it was found to be lowered to −13 μC/g.

What is claimed is:

1. A colored resin composition comprising: a matrix phase comprised of a thermoplastic polyester and a thermoplastic modified polyester graft-copolymerized with styrene; a dispersed phase comprised of a thermoplastic styrene polymer, the dispersed phase being dispersed in the matrix phase and being separated in phase from the matrix phase; and a colorant having greater affinity for the thermoplastic styrene polymer of the dispersed phase than for at least one of the thermoplastic polyester and the thermoplastic modified polyester graft-copolymerized with styrene of the matrix phase so that substantially the entire amount of the colorant remains in the dispersed phase.

2. A colored resin composition according to claim 1; wherein the mean particle size of the dispersed phase is 10 microns or less.

3. A colored resin composition according to claim 2; wherein the mean particle size of the dispersed phase is 5 microns or less.

4. A colored resin composition according to claim 1; wherein the colorant comprises an organic dye.

5. A colored resin composition according to claim 1; wherein the thermoplastic polyester has a glass transition temperature of 40° to 150° C. and a number-average molecular weight of 500 to 30,000.

6. A colored resin composition according to claim 5; wherein the thermoplastic polyester has a glass transition temperature of 60° to 130° C. and a number-average molecular weight of 1,000 to 20,000.

7. A colored resin composition according to claim 1; wherein the styrene polymer has a glass transition temperature of 30° to 105° C. and a number-average molecular weight of 1,000 to 150,000.

8. A colored resin composition according to claim 7; wherein the styrene polymer has a glass transition temperature of 40° to 80° C. and a number-average molecular weight of 2,000 to 100,000.

9. A colored resin composition according to claim 1; wherein the affinity is defined by the electrical attracting force between the colorant and the constituents of the dispersed phase and the matrix phase.

* * * * *